Jan. 13, 1931.   E. S. LAMAR   1,788,465
LIQUID MEASURING DEVICE
Filed Sept. 13, 1929   2 Sheets-Sheet 1

Jan. 13, 1931. E. S. LAMAR 1,788,465
LIQUID MEASURING DEVICE
Filed Sept. 13, 1929 2 Sheets-Sheet 2

Inventor,
Edward S. Lamar,
By Davis & Davis
Attorneys

Patented Jan. 13, 1931

1,788,465

UNITED STATES PATENT OFFICE

EDWARD S. LAMAR, OF ROCKVILLE, MARYLAND

LIQUID-MEASURING DEVICE

Application filed September 13, 1929. Serial No. 392,371.

It is a well known fact today that gasoline may change in temperature from the time of delivery to a service station or other place of distribution to the time of sale. This is true especially in the heat of the summer. Then the gasoline is delivered in tank trucks that have been in the sun and is put into tanks buried under the ground. Immediately after delivery, a measurement of the volume of the liquid is made and the settlement is made on the basis of that measurement. After the liquid has been in the tank for a length of time sufficient to allow the liquid to assume the temperature of the cool underground tank, a measurement of the volume of the liquid shows a decrease from the original measurement due to contraction on cooling. The dealer, buying and selling on the basis of volume without regard to changes in temperature, therefore suffers an appreciable loss in hot weather, his time of maximum business.

In general, the present invention has for its object the measurement of the quantity of any liquid in a container by weight or by volume corrected for thermal expansion or contraction to some particular temperature taken as the standard temperature for such measurements of liquid volume. Particular attention is called to the application of the device to the problem of obtaining a fair and accurate measurement of a quantity of gasoline after it is poured into a buried gasoline-tank at a filling station, whether the tank be empty or partly filled. My device finds its highest degree of utility in connection with tanks which are circular or oval in vertical section because in these shapes the area in horizontal cross-section varies at different heights. With this shape of tank, a given quantity of liquid (less than a full-tank quantity) dumped into the tank will raise the level of liquid in the tank a greater distance when that level is near the bottom or top than when said level is near the point of greatest horizontal cross-sectional area of the tank.

One embodiment is illustrated in the accompanying drawings forming part of this application, in which—

Fig. 3 is a detail plan view taken on the line 3—3 of Fig. 1.

Figure 1:
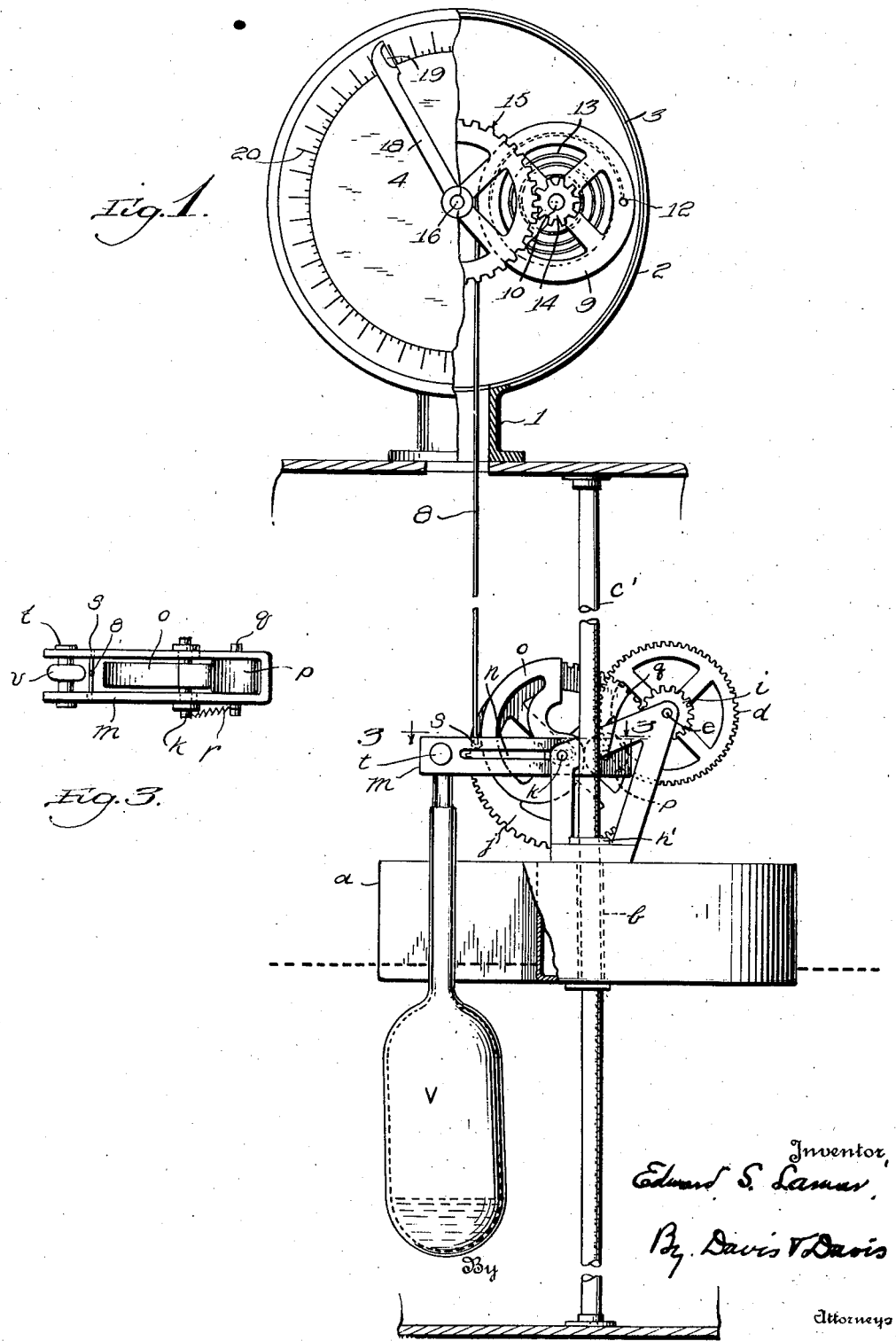
Fig. 1 is a face view of the float and indicating mechanisms of the device.
Figure 2:
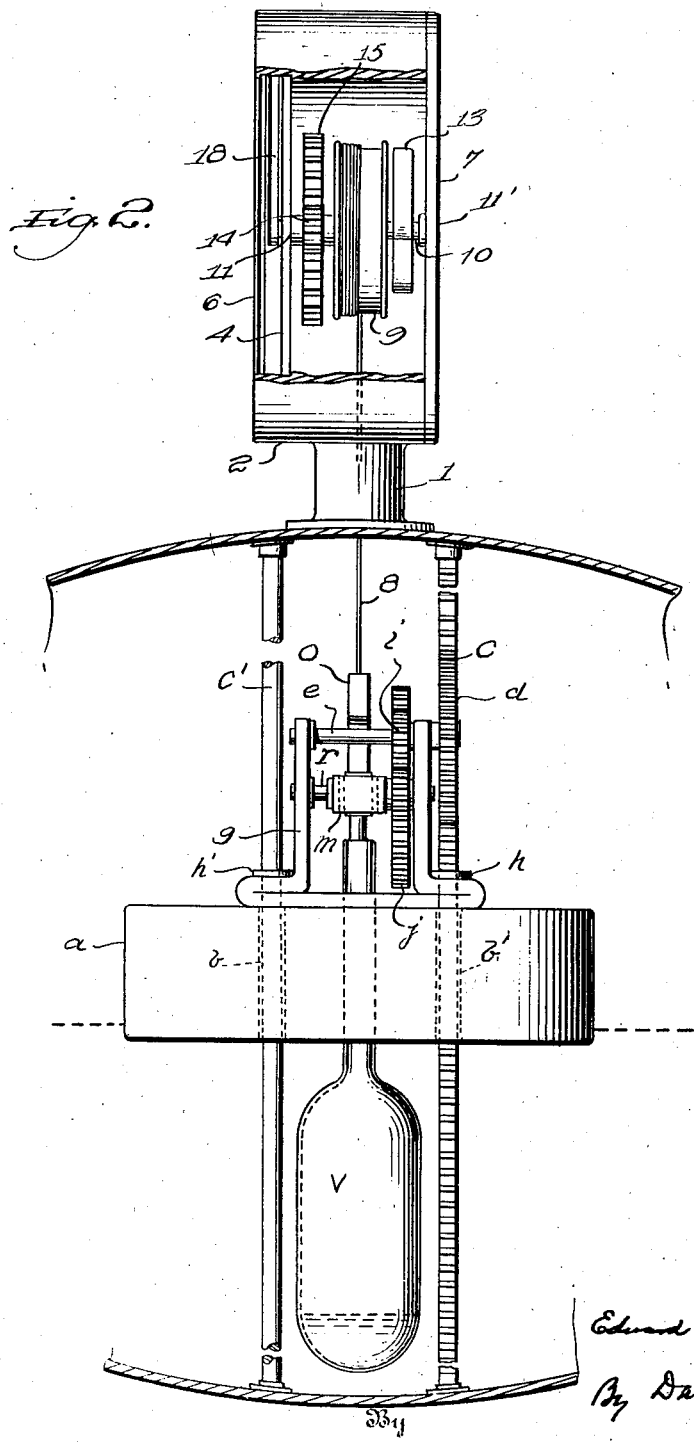
Fig. 2 is a side view of the same mechanisms.

The device consists of a broad flat main float $a$ which could be constructed of sheet metal. Through the float $a$ are two tubes $b$ and $b'$ which enable the float $a$ to slide freely up and down rods $c$ and $c'$ which pass through the tubes $b$ and $b'$ and extend from top to bottom of the oval-shaped tank, where they are respectively anchored. The rod $c$ is toothed its entire length and is in mesh with a gear-wheel $d$ which is mounted on a shaft $e$. The shaft $e$ is supported by its bearings which consist of holes drilled in a support $g$. The support $g$ is made of sheet metal and is fastened to the float $a$ by means of collars $h$ and $h'$ on the tubes $b$ and $b'$. On the shaft $e$ is mounted a pinion $i$ which is in mesh with a gear $j$. The ratio of the gearing is such that the movement of the float $a$ from top to bottom of the tank along the rods $c$ and $c'$ causes a complete revolution of the gear $j$. The gear $j$ is mounted on a shaft $k$ supported by bearing holes drilled in the support $g$. A lever $m$ consisting of two arms, preferably made of a single piece of sheet metal, is supported by the shaft $k$. Said support of the lever $m$ is accomplished by having the shaft $k$ pass through slots $n$ in the two parts of the lever $m$. The lever $m$ is thus allowed to slide along perpendicular to the shaft $k$ the length of the slots $n$. Mounted on the shaft $k$ and situated between the two members of the lever $m$ is a cam $o$. The cam $o$ bears against a friction-reducing wheel $p$ mounted on a shaft $q$. The shaft $q$ is supported by its bearings which consist of holes drilled in the two members of the lever $m$. A retractile coil-spring $r$ is fastened at one end to the shaft $k$ and at the other end to an extension of the shaft $q$, to thus cause the wheel $p$ to normally bear against the cam $o$. At a point $s$ on the lever $m$ is attached a wire, preferably of the braided or stranded type, which extends upward to an indicating device situated on the top of the tank. A shaft $t$ is mounted in bearing holes drilled in the two members of the lever $m$. To the shaft $t$ is attached a supplemental float $v$ which has the shape of the usual hydrometer bulb. There is a radial notch in the float $a$ which enables the float $v$ to move back and forth with the lever $m$. The connection of the float $v$ to the shaft $t$ could be made by means of an adjustable screw. By changing the adjustment of the screw, the float $v$ could be raised or lowered with respect to the lever $m$. This adjustment would make it possible to use the same apparatus to measure corrected volume of liquids differing slightly in density at the standard temperatures.

Keeping in mind that my device is especially designed for use in tanks whose horizontal cross-sectional area varies at different heights, its operation is as follows: It is desired to have the indicating mechanism show the level the liquid would have if it were at a predetermined standard temperature regardless of the actual temperature. As a specific case, let us consider an increase in temperature of the liquid above the standard temperature. The liquid will expand and its level rise. The density of the liquid will decrease and thus the vertical float $v$ will sink deeper with respect to the level of the liquid. The float $a$, being a broad flat float, will rise as the level of the liquid rises. The point $s$ on the lever $m$, to which is attached the wire which leads to the indicating device, will assume a position which indicates the level of the float $a$ (and thus that of the liquid) minus the depth to which the float $v$ has sunk with respect to the surface of the liquid, due to the change in density multiplied by the ratio of the levers represented by the distance from the shaft $k$ to the point $s$ and from the shaft $k$ to the shaft $t$. The float $v$ and the cam $o$ are so designed that this quantity subtracted is exactly equal to the increase in level caused by expansion of the liquid. The necessity for the cam $o$ can be easily seen, for the depth to which the float $v$ will sink with respect to the level of the liquid depends only on the change in density of the liquid. The change in level of the liquid for a definite change in density would be different for different levels; thus, in order to make the quantity subtracted always equal to the change in level of the liquid, it is necessary to change the ratio of the lever arms. The cam, as seen in the diagrams, controls the ratio of the lever arms and is designed so as to give the correct ratio at any level. The length of the wire, connected at the point $s$ to lever $m$, from the point $s$ to the indicating device at the top of the tank would thus depend upon the level the liquid would have if it were at the standard temperature.

A possible type of indicating device to be used in connection with my invention is shown. A flanged tube 1 serves to connect the device to the tank, the upper end of the tube being threaded so that it may be attached to the casing 2. Said casing 2 is shown with the face removed and with part of the casing 2 removed. A shoulder 3 is machined in the casing 2 and serves as a seat for the face 4. The glass 6 is fastened on the outside by a ring threaded into the casing 2, formed by bending the casing 2 over the glass or by some other similar means. The back 7 goes on the casing 2 as indicated. The face 4 and the back 7 are fastened to the casing 2 by means of screws. The wire 8 which extends from the point $s$ of the float mechanism goes through the tube 1 and winds up on a drum 9. Drum 9 is mounted on a shaft 10 which is supported by its bearings 11 and 11'. Said bearings 11 and 11' consist of holes drilled in the face 4 and the back 7. Connected at one end to the shaft 10 and at the other to a pin 12 in the back 7 is a spiral spring 13 which serves to wind up the wire on the drum 9. The spring 13 is designed in a way such that the increase in tension caused by the winding up of the spring is exactly equal to the weight of the wire unwound. In this way, the tension at the point $s$ on the float mechanism is kept constant regardless of the level of the point $s$. In order to decrease the thickness of the indicating device, the spring 13 might actually be inside of the drum 9. On the shaft 10 is a pinion 14 which is in mesh with a gear 15. The gear 15 is mounted on a shaft 16 supported by its bearings 17 and 17' which consists of holes drilled in the face 4 and the back 7. The face-end of shaft 16 extends through the face 4 and accommodates an indicating hand 18. Said hand 18 is shaped as shown in the diagrams and holds a wire 19 to facilitate accurate reading on a scale 20. Said scale 20 can be calibrated to read in units of weight or of corrected volume. The part shown in the drawing as scale 20 might consist of a circular scale and a circular mirror. The circular mirror would eliminate any errors in reading the scale due to parallax. As the point $s$ on the float mechanism rises or sinks, the wire winds up or unwinds from the drum 9. This causes the hand 18 to move over the scale 20. The position of the hand thus indicates the quantity, by weight or by corrected volume, of the liquid in the tank.

What I claim as new is:

1. A liquid-measuring apparatus consisting of a float-structure adapted to rise and fall as a whole with the level of the liquid to be measured embodying two relatively-movable floats having different flotation capacities and therefore different immersing capacities in any liquid of a given density, an indicating-device, and means actuating said indicating-device by the up and down movement of said float-structure as a whole, said means embodying devices for modifying said actuation in accordance with the changes in the density and height of the liquid.

2. The structure defined in claim 1, said indicating-device embodying a cable connected at one end to said means and a self-winding drum connected to the other end of said cable and acting to normally wind-up said cable and also to actuate the indicating-device.

3. The structure defined in claim 1, said modifying devices embodying a lever and means for shifting its fulcrum with changes in the density of the liquid.

4. The structure defined in claim 1, said modifying devices embodying a pivoted lever and a cam for shifting said lever in order to shift its fulcrum.

5. The structure defined in claim 1, said means embodying also a train of gearing and a rack-bar actuated by said gearing and mounted in the tank used to hold the liquid.

6. The structure defined in claim 1, said means embodying a train of gearing mounted on one of said floats, a cam actuated by said gearing, a lever mounted on said float and connected to the other float and also to the indicating-device, the cam and the lever being so associated that the rise and fall of the float-structure actuates the cam and shifts the fulcrum of the lever.

In testimony whereof I hereunto affix my signature.

EDWARD S. LAMAR.